US009542621B2

(12) United States Patent
He et al.

(10) Patent No.: US 9,542,621 B2
(45) Date of Patent: Jan. 10, 2017

(54) SPATIAL PYRAMID POOLING NETWORKS FOR IMAGE PROCESSING

(71) Applicant: Microsoft Technology Licensing, LLC, Redmond, WA (US)

(72) Inventors: Kaiming He, Beijing (CN); Jian Sun, Beijing (CN); Xiangyu Zhang, Anhui (CN); Shaoqing Ren, Anhui (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 173 days.

(21) Appl. No.: 14/617,936

(22) Filed: Feb. 10, 2015

(65) Prior Publication Data
US 2016/0104056 A1 Apr. 14, 2016

(30) Foreign Application Priority Data

Oct. 9, 2014 (CN) .................. PCT/CN2014/088166

(51) Int. Cl.
| | |
|---|---|
| *G06K 9/62* | (2006.01) |
| *G06K 9/46* | (2006.01) |
| *G06K 9/66* | (2006.01) |
| *G06N 3/04* | (2006.01) |

(52) U.S. Cl.
CPC .......... *G06K 9/6255* (2013.01); *G06K 9/4609* (2013.01); *G06K 9/4628* (2013.01); *G06K 9/66* (2013.01); *G06N 3/04* (2013.01)

(58) Field of Classification Search
CPC .... A01B 12/006; G06K 9/166; G06K 9/4628; G06N 3/04

USPC ........ 382/128, 131, 154, 156, 159; 128/925; 706/15, 16, 25
See application file for complete search history.

(56) References Cited

U.S. PATENT DOCUMENTS

| | | | | |
|---|---|---|---|---|
| 5,568,590 | A * | 10/1996 | Tolson | .................... G06T 11/60 706/13 |
| 6,687,657 | B2 * | 2/2004 | Levin | .................... B82Y 15/00 702/125 |
| 8,131,658 | B2 * | 3/2012 | McKinstry | ........... G05B 13/026 706/14 |
| 8,233,711 | B2 | 7/2012 | Wang et al. | |

(Continued)

OTHER PUBLICATIONS

Chang, et al., "Libsvm: A Library for Support Vector Machines", In ACM Transactions on Intelligent Systems and Technology, May 2011, 39 pages.

(Continued)

*Primary Examiner* — Yosef Kassa
(74) *Attorney, Agent, or Firm* — Cassandra T Swain; Micky Minhas (57) ABSTRACT

Spatial pyramid pooling (SPP) layers are combined with convolutional layers and partition an input image into divisions from finer to coarser levels, and aggregate local features in the divisions. A fixed-length output may be generated by the SPP layer(s) regardless of the input size. The multi-level spatial bins used by the SPP layer(s) may provide robustness to object deformations. An SPP layer based system may pool features extracted at variable scales due to the flexibility of input scales making it possible to generate a full-image representation for testing. Moreover, SPP networks may enable feeding of images with varying sizes or scales during training, which may increase scale-invariance and reduce the risk of over-fitting.

20 Claims, 5 Drawing Sheets

(56) References Cited

U.S. PATENT DOCUMENTS

| | | | |
|---|---|---|---|
| 8,356,004 B2* | 1/2013 | Jung | A61B 5/744 706/62 |
| 8,374,442 B2 | 2/2013 | Yu et al. | |
| 8,402,490 B2* | 3/2013 | Hoffberg-Borghesani | G05B 19/0426 725/46 |
| 8,447,767 B2 | 5/2013 | Ah-Pine et al. | |
| 8,656,338 B2* | 2/2014 | Koushanfar | G06F 17/5054 716/104 |
| 8,787,682 B2 | 7/2014 | Yang et al. | |
| 2011/0116711 A1 | 5/2011 | Wang et al. | |
| 2011/0229045 A1 | 9/2011 | Yu | |
| 2013/0129199 A1 | 5/2013 | Russakovsky et al. | |
| 2014/0037195 A1 | 2/2014 | Lin et al. | |

OTHER PUBLICATIONS

Chatfield, et al., "The Devil is in the Details: An Evaluation of Recent Feature Encoding Methods", In British Machine Vision Conference, Aug. 29, 2011, 12 pages.

Cheng, et al., "BING: Binarized normed gradients for objectness estimation at 300fps", In IEEE Computer Society Conference on Computer Vision and Pattern Recognition, Jun. 24, 2014, 8 pages.

Coates, et al., "The Importance of Encoding Versus Training With Sparse Coding and Vector Quantization", In Proceedings of the 28th International Conference on Machine Learning, Jun. 28, 2011, 8 pages.

Dalal, et al., "Histograms of oriented gradients for human detection", In Proceedings of the IEEE Computer Society Conference on Computer Vision and Pattern Recognition, Jun. 25, 2005, 8 pages.

Deng, et al., "Imagenet: A Large-Scale Hierarchical Image Database", In IEEE Conference on Computer Vision and Pattern Recognition, Jun. 25, 2009, 8 pages.

Denton, et al., "Exploiting Linear Structure within Convolutional Networks for Efficient Evaluation", In Proceeding of the Computing Research Repository, Apr. 2014, 11 pages.

Donahue, et al., "Decaf: A deep convolutional activation feature for generic visual recognition", In arXiv preprint arXiv:1310.1531, Oct. 2013, 10 pages.

Everingham, et al., "The Pascal Visual Object Classes (VOC) Challenge", In Journal International Journal of Computer Vision, vol. 88, Issue 2, Jun. 2010, 34 pages.

Fei, et al., "Learning generative visual models from few training examples: An Incremental Bayesian Approach Tested on 101 Object Categories", In Journal Computer Vision and Image Understanding, vol. 106, Issue 1, Apr. 2007, 9 pages.

Felzenszwalb, et al., "Object Detection with Discriminatively Trained Partbased Models", In IEEE Transactions on Pattern Analysis and Machine Intelligence, vol. 32, Issue 9, Sep. 2010, 20 pages.

Girshick, et al., "Rich Feature Hierarchies for Accurate Object Detection and Semantic Segmentation", In Conference on Computer Vision and Pattern Recognition, Jun. 14, 2014, 8 pages.

Gong, et al., "Multi-scale orderless pooling of deep convolutional activation features", In Proceedings of arXiv:1403.1840, Mar. 2014, 16 pages.

Grauman, et al., "The Pyramid Match Kernel: Discriminative Classification with Sets of Image Features", In Tenth IEEE International Conference on Computer Vision, Oct. 17, 2005, 8 pages.

Howard, Andrew G., "Some Improvements on Deep Convolutional Neural Network Based Image Classification", In Proceeding of the Computing Research Repository, Dec. 2013, 6 pages.

Krizhevsky, et al., "Imagenet classification with deep convolutional neural networks", In Advances in Neural Information Processing Systems, Dec. 3, 2012, 9 pages.

Lazebnik, et al., "Beyond Bags of Features: Spatial Pyramid Matching for Recognizing Natural Scene Categories", In Proceedings of the IEEE Computer Society Conference on Computer Vision and Pattern Recognition—vol. 2, Jun. 17, 2006, 8 pages.

Lecun, et al., "Backpropagation applied to handwritten zip code recognition", In Journal Neural Computation, vol. 1, Issue 4, Dec. 1, 1989, 11 pages.

Lowe, David G., "Distinctive Image Features from Scale-Invariant Keypoints", In Journal International Journal of Computer Vision, vol. 60, Issue 2, Jan. 5, 2004, 28 pages.

Mathieu, et al., "Fast training of convolutional networks through ffts", In Proceeding of arXiv:1312.5851, Dec. 2013, 9 pages.

Oquab, et al., "Learning and Transferring Mid-Level Image Representations using Convolutional Neural Networks", In Proceedings of the Computer Society Conference on Computer Vision and Pattern Recognition, Jun. 24, 2014, 8 pages.

Perronnin, et al., "Improving the Fisher Kernel for Large-Scale Image Classification", In Proceedings of the 11th European conference on Computer vision: Part IV, Sep. 5, 2010, 14 pages.

Razavian, et al., "Cnn features off-the-shelf: An astounding baseline for recogniton", In Proceedings of the Computer Society Conference on Computer Vision and Pattern Recognition, Mar. 2014, 8 pages.

Sermanet, et al., "Overfeat Integrated Recognition, Localization and Detection Using Convolutional Networks", In Proceeding of arXiv preprint arXiv:1312.6229, Dec. 21, 2013, 16 pages.

Sivic, et al., "Video google: a text retrieval approach to object matching in videos", In Proceedings of the Ninth IEEE International Conference on Computer Vision, Oct. 13, 2003, 8 pages.

Szegedy, et al., "Deep Neural Networks for Object Detection", In Proceeding of Neural Information Processing Systems Foundation, Dec. 2013, 9 pages.

Taigman, et al., "Deepface:Closing the gap to human-level performance in face verification", In Proceedings of the IEEE Conference on Computer Vision and Pattern Recognition, Mar. 11, 2014, 8 pages.

Sande, et al., "Segmentation as Selective Search for Object Recognition", In IEEE International Conference on Computer Vision, Nov. 6, 2011, 8 pages.

Gemert, et al., "Kernel Codebooks for Scene Categorization", In Proceeding of 10th European Conference on Computer Vision, Oct. 12, 2008, 15 pages.

Wang, et al., "Locality-Constrained Linear Coding for Image Classification", In IEEE Conference on Computer Vision and Pattern Recognition, Jun. 13, 2010, 8 pages.

Wang, et al., "Regionlets for generic object detection", In IEEE International Conference on Computer Vision, Dec. 2013, 8 pages.

Yang, et al., "Linear Spatial Pyramid Matching using Sparse Coding for Image Classification", In IEEE Computer Society Conference on Computer Vision and Pattern Recognition.

Zeiler, et al., "Visualizing and Understanding Convolutional Neural Networks", In Proceeding of the Computing Research Repository, Nov. 2013, 11 pages.

Zhang, et al., "Panda: Pose aligned networks for deep attribute modeling", In Conference on Computer Vision and Pattern Recognition, Jun. 24, 2014, 8 pages.

Zou, et al., "Generic object detection with dense neural patterns and regionlets", In Proceeding of the Computing Research Repository, Apr. 2014, 9 pages.

He, et al., "Spatial Pyramid Pooling in Deep Convolutional Networks for Visual Recognition", In Proceeding of arXiv preprint arXiv:1406.4729, Jun. 2014, 11 pages.

Araujo, Andre Filgueiras De, "Tag-Sensitive Features for Large-Scale Scene Classification", Retrieved on: Aug. 14, 2014 Available at: http://web.stanford.edu/~afaraujo/FilgueirasdeAraujo-TagSensitiveFeaturesForLargeScaleSceneClassification.pdf.

Simonyan, et al., "Deep Fisher Networks for Large-Scale Image Classification", In Proceedings of 27th Annual Conference on Neural Information Processing Systems, Dec. 5, 2013, 9 pages.

Farabet, et al., "Learning Hierarchical Features for Scene Labeling", In Proceedings of IEEE Transactions on Pattern Analysis and Machine Intelligence, vol. 35, No. 8, Aug. 2013, 15 pages.

Borth, et al., "Large-scale Visual Sentiment Ontology and Detectors Using Adjective Noun Pairs", In Proceedings of the 21st ACM International Conference on Multimedia, Oct. 21, 2013, 10 pages.

(56) References Cited

OTHER PUBLICATIONS

Kiros, et al., "Deep Representations and Codes for Image Auto-Annotation", In Proceedings of 26th Annual Conference on Neural Information Processing Systems, Dec. 3, 2012, 9 pages.

Malinowski, et al., "Learnable Pooling Regions for Image Classification", In Proceedings of the Computing Research Repository, Jan. 2013, 10 pages.

Han, et al., "Hierarchical spatial pyramid max pooling based on SIFT features and sparse coding for image classification", In Proceedings of IET Computer Vision, vol. 7, Issue 2, Apr. 2013, 7 pages.

Vijayanarasimhan, et al., "Large-Scale Live Active Learning Training Object Detectors with Crawled Data and Crowds", In Proceedings of the IEEE Conference on Computer Vision and Pattern Recognition, Jun. 20, 2011, 8 pages.

Zhang, et al., "Discriminative Cellets Discovery for Fine-Grained Image Categories Retrieval", In Proceedings of International Conference on Multimedia Retrieval, Apr. 1, 2014, 8 pages.

"International Search Report & Written Opinion Received for PCT Application No. PCT/CN2014/088166", Mailed Date: Jul. 17, 2015, 11 pages.

\* cited by examiner

SPATIAL PYRAMID POOLING NETWORKS FOR IMAGE PROCESSING

CROSS-REFERENCE TO RELATED APPLICATIONS

This Application claims priority to PCT Application Ser. No. PCT/CN2014/088166 filed on Oct. 9, 2014. The PCT application is hereby incorporated by reference in its entirety.

BACKGROUND

Computer vision includes acquisition, processing, analysis, and understanding of images and, in general, high-dimensional data from the real world in order to produce numerical or symbolic information, for example, in the forms of decisions. The image understanding may be seen as the disentangling of symbolic information from image data using models constructed with the aid of geometry, physics, statistics, and learning theory. The image data may take many forms, such as video sequences, views from multiple cameras, or multi-dimensional data from a medical scanner. Further areas of computer vision may include scene reconstruction, event detection, video tracking, object recognition, learning, indexing, motion estimation, and image restoration.

Computer vision technologies are typically complex undertakings involving large amounts of computing resources and lacking accuracy in many cases. For example, existing deep convolutional neural networks (CNNs) involve a fixed-size (e.g., 224×224) input image. This requirement is "artificial" and may reduce the recognition accuracy for the images or sub-images of an arbitrary size/scale.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to methods, devices, and systems to process images using spatial pyramid pooling networks. An example method may include receiving an input image; generating feature maps by one or more filters on one or more convolutional layers of a neural network; spatially pooling responses of each filter of a top convolutional layer at a spatial pyramid pooling (SPP) network following the top convolutional layer, where the SPP network comprises one or more layers; and providing outputs of a top SPP network layer to a fully-connected layer as fixed dimensional vectors.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, spatial pyramid pooling (SPP) layers may be combined with convolutional layers and partition the image into divisions from finer to coarser levels, and aggregate local features in the divisions. A fixed-length output may be generated by the SPP layer(s) regardless of the input size. The multi-level spatial bins used by the SPP layer(s) may provide robustness to object deformations. An SPP layer based system may pool features extracted at variable scales due to the flexibility of input scales making it possible to generate a full-image representation for testing. Moreover, SPP networks may enable feeding of images with varying sizes or scales during training, which may increase scale-invariance and reduce the risk of over-fitting.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for image processing. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
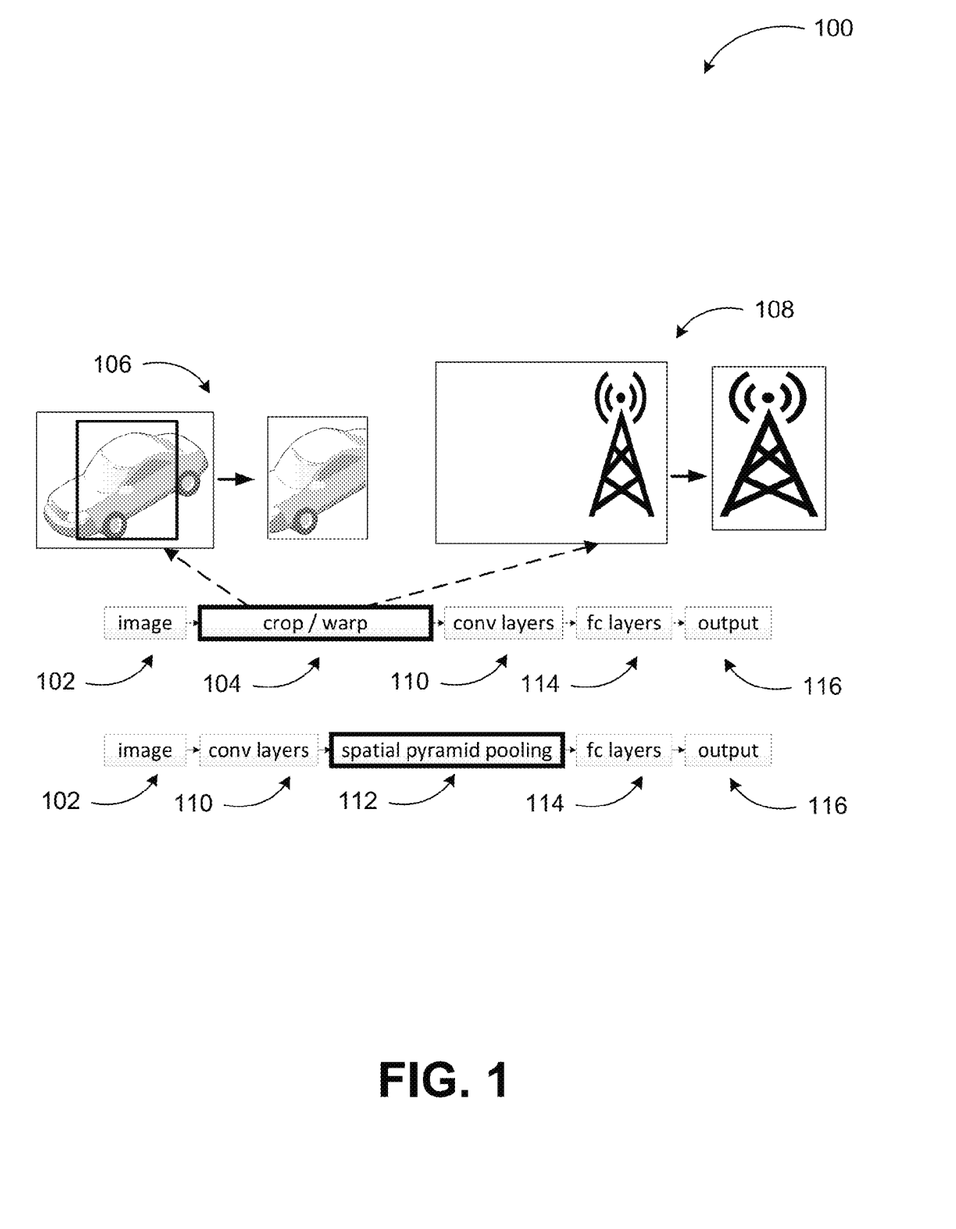
FIG. 1 illustrates conceptually the processes of CNN based image processing and SPP based image processing.

FIG. 1 illustrates conceptually the processes of CNN based image processing and SPP based image processing.

The use of deep convolutional neural networks (CNNs) and the availability of large scale training data is resulting in revolutionary changes in the vision technologies, specifically, in image analysis and object detection. Deep-networks based approaches are used in image classification, object detection, and other recognition or non-recognition tasks. As mentioned above, fixed-length output may be generated by the SPP layer(s) regardless of the input size while sliding window pooling used in conventional deep networks cannot. The multi-level spatial bins used by the SPP layer(s) may provide robustness to object deformations while the sliding window pooling uses only a single window size.

A technical shortcoming of the CNNs is the fact that they require a fixed input image size. As shown in diagram 100, a conventional CNN based image processing system starts out with an input image 102, which may be subject to cropping or warping 104 as shown in the example illustrations 106 and 108. The cropped or warped image may then be processed by the convolutional layers 110, followed by the fully-connected layers 114, which provide the output 116. The cropped region may not contain the entire object, while the warped content may result in unwanted geometric distortion. Thus, recognition accuracy may be compromised due to the content loss or distortion. Moreover, a pre-defined scale (for example, 224) may not be suitable when object scales vary. Fixing the input size may overlook the issues involving scales.

The convolutional layers may operate in a sliding-window manner and output feature maps, which represent the spatial arrangement of the activations. Indeed, convolutional layers may not require a fixed image size and may generate feature maps of any sizes. On the other hand, the fully-connected layers may need to have fixed-size/length input by their definition. Hence, the fixed-size constraint may come from the fully-connected layers, which exist at a deeper stage of the network.

In contrast with the conventional neural networks for image processing, a system according to embodiments may process the input image 102 at the convolutional layers 110 first regardless of its size or scale, then perform further processing at an SPP layer 112, which may provide the needed fixed size input to the fully-connected layers 114.

The example image in FIG. 1 has been described with specific images of particular size, type, and shape. Embodiments are not limited to the detection of objects of particular sizes, shapes, or types, as well as images of particular size, type, or content. A system for image processing using spatial pyramid pooling according to embodiments may be implemented in configurations that can work with any size, type, or content of image and detect objects of any size, shape, or type using the principles described herein.

Figure 2:
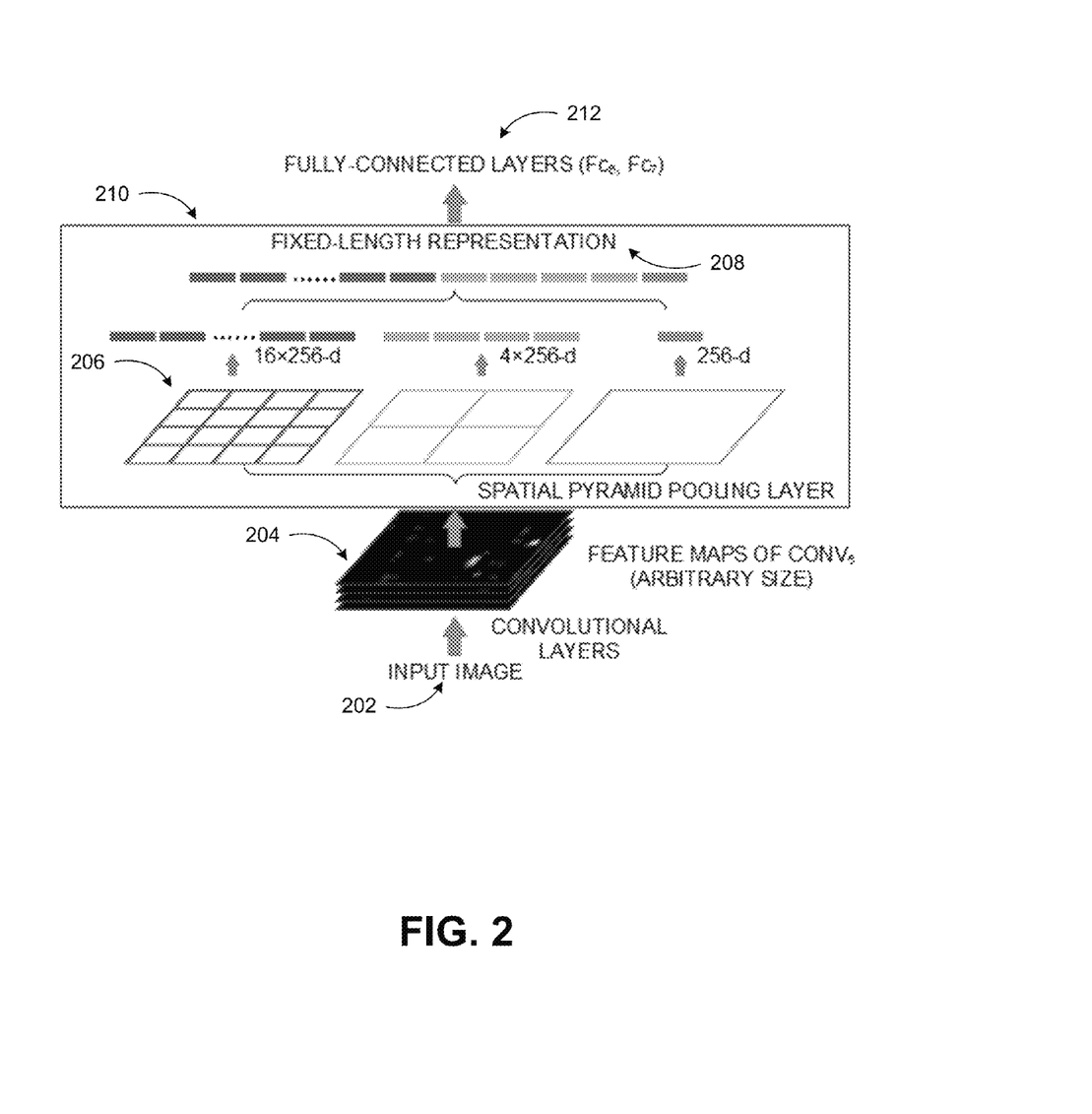
FIG. 2 illustrates an example neural network structure with a spatial pyramid pooling layer.

FIG. 2 illustrates an example neural network structure with a spatial pyramid pooling layer.

The convolutional layers 204 may accept arbitrary input image 202 sizes, but they produce outputs of variable sizes. The fixed-length representations given by the pre-trained networks may also be used to train classifiers (such as SVM or softmax) on other datasets. The classifiers or fully-connected layers, on the other hand, may require fixed-length vectors as input. Spatial pyramid pooling may generate such vectors while maintaining spatial information by pooling in local spatial bins. The spatial bins may have sizes proportional to the image size, so the number of bins may be fixed regardless of the image size in contrast to the sliding window pooling of the conventional deep networks, where the number of sliding windows depends on the input size.

To adopt the deep network for images of arbitrary sizes, the pooling layer after convolutional layer 5 (conv5) may be replaced with a spatial pyramid pooling layer 210, for example. In each spatial bin, the responses of each filter may be pooled. Maximum pooling is one example method of pooling, but other pooling methods may also be used. In one example implementation, the outputs 208 of the spatial pyramid pooling may be kM-dimensional vectors with the number of bins denoted as M (k being the number of conv5 filters). The fixed-dimensional vectors may then be provided as input to the fully-connected layer (fc6) 212.

With spatial pyramid pooling, the input image may be of any size allowing not only arbitrary aspect ratios, but also arbitrary scales. The input image may be resized to any scale (for example, min(w; h)=180, 224, . . . ) and the same deep network applied to the input image. When the input image is at different scales, the network (with the same filter sizes) may extract features at different scales.

The above described network structure may be trained with standard back-propagation, regardless of the input image size. In practical graphical processing unit (GPU) implementations, fixed input images may be used, however. Yet, the GPU implementations may be taken advantage of while still preserving the spatial pyramid pooling behaviors.

In one example scenario, the network may receive a fixed-size input (224×224) cropped from images. The cropping may be used for the purpose of data augmentation. For an image with a given size, the bin sizes needed for spatial pyramid pooling may be pre-computed. Considering the feature maps after conv5 that have a size of a×a (for example, 13×13) with a pyramid level of n×n bins, the pooling level may be implemented as a sliding window pooling, where the window size win=⌈a/n⌉ and stride str=⌊a/n⌋ with ⌈.⌉ and ⌊.⌋ denoting ceiling and floor operations. With a l-level pyramid, l such layers may be implemented. The next fully-connected layer (fc6) may concatenate the l outputs. In an example configuration, a 3-level spatial pyramid pooling network with a feature map size of conv5 13×13 may have pooling layers with 3×3, 2×2, and 1×1 bins, respectively. Single-size training may enable the multi-level pooling behavior and also provide increased accuracy.

To address varying image sizes in training, a set of pre-defined sizes may be considered. For example, two sizes (180×180 and 224×224) may be used, although any number of sizes may be implemented as well. Rather than crop a smaller 180×180 region, the aforementioned 224×224 region may be resized to 180×180. Thus, the regions at both scales may differ only in resolution but not in content and/or layout. For the network to accept 180×180 inputs, another fixed-size-input (180×180) network may be implemented. The feature map size after conv5 may be a×a=10×10 in this case. Then, window size win=⌈a/n⌉ and stride str=⌊a/n⌋ may still be used to implement each pyramid pooling level. The output of the spatial pyramid pooling layer of this 180-network may have the same fixed length as the 224-network. As such, this 180-network may have exactly the same parameters as the 224-network in each layer. In other words, during training the varying-size-input SPP-network may be implemented by two fixed-size-input networks that share parameters.

To reduce the overhead of switching from one network (for example, 224) to the other (for example, 180), each full epoch may be trained on one network, and then switched to the other one (copying all weights) for the next full epoch. This may be performed iteratively. The convergence rate of this multi-size training may be similar to the above discussed single-size training. Multi-size training may be used to simulate the varying input sizes while still leveraging the existing well-optimized fixed-size implementations. Additional scales l aspect ratios may also be used, with one network for each scale l aspect ratio and all networks sharing weights according to other embodiments. Alternatively, a varying-size implementation may be used to avoid network switching. It should be noted that the single/multi-size approached described herein may be used for training. At the testing stage, the SPP-network may be applied on images of any sizes.

Figure 3:
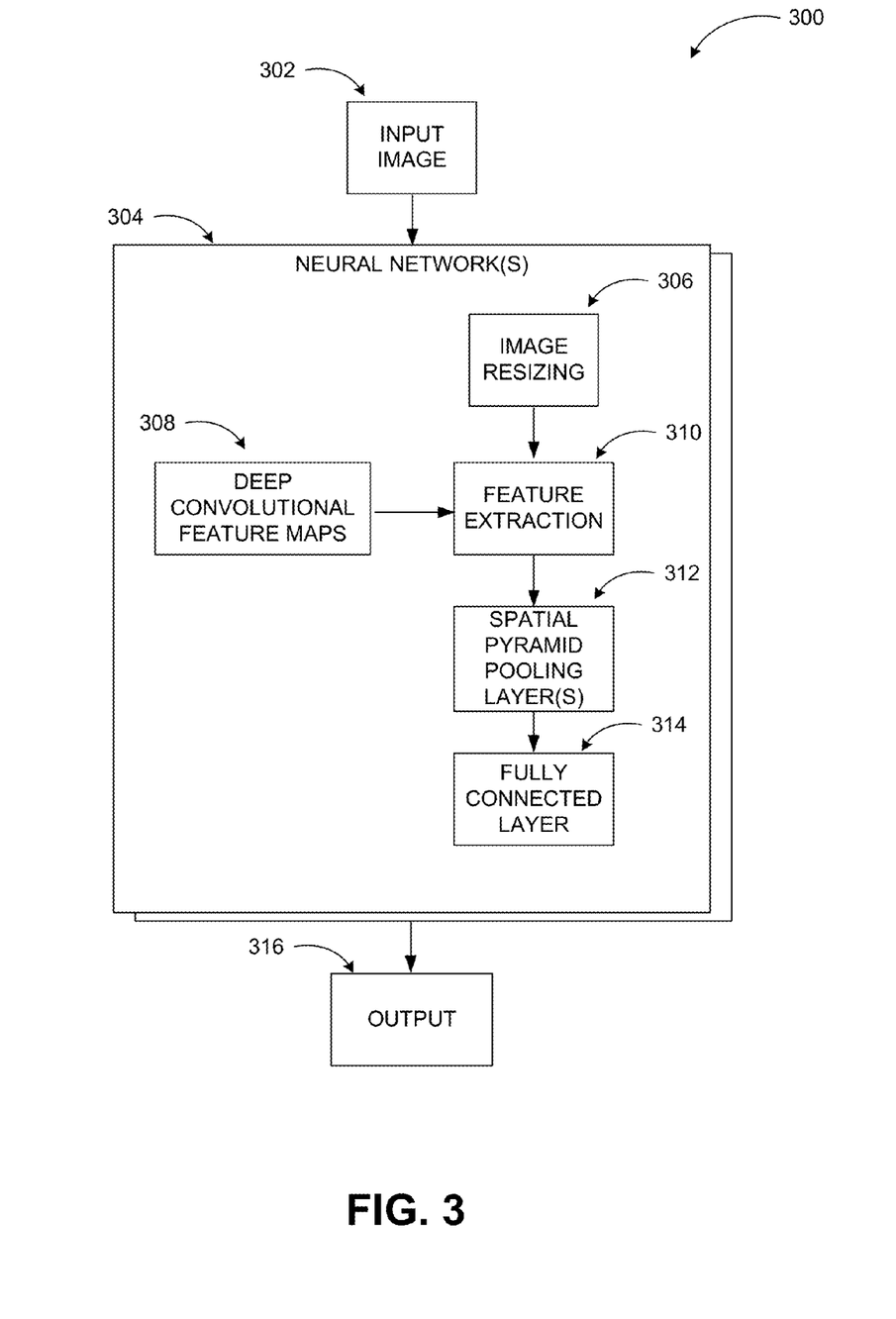
FIG. 3 illustrates block diagram of a system for image processing that includes an SPP layer along with convolutional neural network layers according to some embodiments.

FIG. 3 illustrates block diagram of a system for image processing that includes an SPP layer along with convolutional neural network layers according to some embodiments.

In a system according to embodiments, a gain of the multi-level pooling is not simply due to more parameters. Rather, it is because the multi-level pooling is robust to the variance in object deformations and spatial layout. Because the usage of a spatial pyramid pooling based network does not depend on scale, the images may be resized so that the smaller dimension and the same network may be used to extract features.

As shown in diagram 300, an image processing system according to embodiments may employ one or more neural networks 304 to process an input image 302 and provide an output 316 that may be used in training a classifier, scene reconstruction, event detection, video tracking, object recognition, image indexing, or motion estimation. The feature maps may be extracted from the entire image once (optionally at multiple scales). Then, the spatial pyramid pooling may be applied on each candidate window of the feature maps to pool a fixed-length representation of this window. Because the potentially time-consuming convolutional network is applied once, the system may detect objects on orders of magnitude faster compared to approaches such as R-CNN.

In some embodiments, window-wise features may be extracted (310) from regions of the feature maps 308. Thus, feature extraction may be enabled in arbitrary windows from the deep convolutional feature maps 308. The input image 302 may be resized to fit the structure of the network. An SPP network 312 of one or more layers that includes spatial bins based on the number of filters a top convolutional layer may pool the extracted features and generate fixed-size outputs for a fully-connected layer 314.

In some examples, the input image 302 may be resized such that min (w; h)=s, where w is the width, h is the height, and s represents a predefined scale (e.g., 256) and the feature maps of conv5 may be extracted from the entire image. In some example implementations, a 4-level spatial pyramid (1×1, 2×2, 3×3, and 6×6, total of 50 bins) may be used for each candidate window to pool the features. This may generate a 12,800-d (256×50) representation for each window. The representations may be provided to the fully-connected layers of the network.

In other embodiments, multi-scale feature extraction may also be used. The image may be resized such that min (w; h)=s∈{480; 576; 688; 864; 1200}, and the feature maps of conv5 may be computed for each scale. In some examples, the features from these scales may be combined by pooling them channel-by-channel. In other examples, a single scale s may be selected for each candidate window such that the scaled candidate window has a number of pixels closest to a predefined value (e.g., 224×224). Then, the feature maps extracted from this scale may be used to compute the feature of this window.

The examples in FIGS. 1 through 3 have been described using specific examples, configurations, and processes spatial pyramid pooling based image processing. Embodiments to perform image processing using spatial pyramid pooling are not limited to the specific examples, configurations, and processes according to these example descriptions.

A system employing SPP-network to process images may advantageously improve usability of object detection in searches, vision systems, and other image analysis implementations, as well as reduce computational expense such as processor load, memory load, and enhance reliability of object detection, for example, in satellite imaging, security monitoring, and comparable systems.

Figure 4:
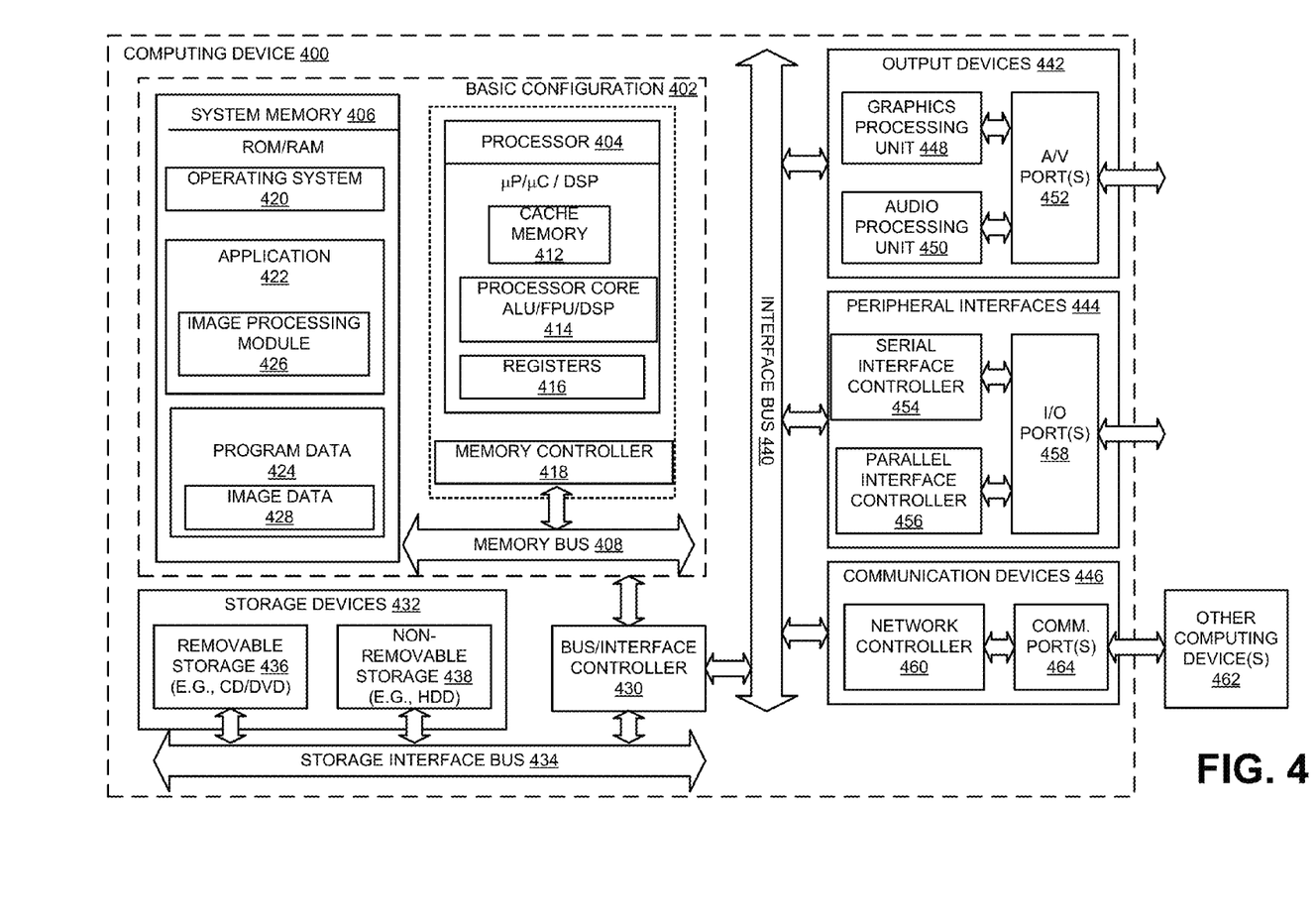
FIG. 4 is a block diagram of an example general purpose computing device, which may be used to manage SPP networks for automatic image processing.

FIG. 4 is a block diagram of an example general purpose computing device, which may be used to process images using spatial pyramid pooling layers.

For example, computing device 400 may be used as a server, desktop computer, portable computer, smart phone, special purpose computer, or similar device. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (μP), a microcontroller (μC), a digital signal processor (DSP), or any combination thereof. The processor 404 may include one more levels of caching, such as a level cache memory 412, one or more processor cores 414, and registers 416. The example processor cores 414 may (each) include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, an application 422, and program data 424. The application 422 may include an image processing module 426, which may be an integral part of the application or a separate application on its own. The image processing module 426 may perform image resizing, feature extraction (using deep convolutional feature maps), spatial pyramid pooling, and classifier training. Optionally, multiple fixed-size networks may be used for different size input images and results of the SPP layers concatenated at the fully-connected layer. The program data 424 may include, among other data, image data 428 related to the enablement of image processing using SPP layers, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 446) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example communication device 446 includes a network controller 460, which may be arranged to facilitate communications with one or more other computing devices 462 over a network communication link via one or more communication ports 464. The one or more other computing devices 462 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods to generic object detection in an image. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 5:
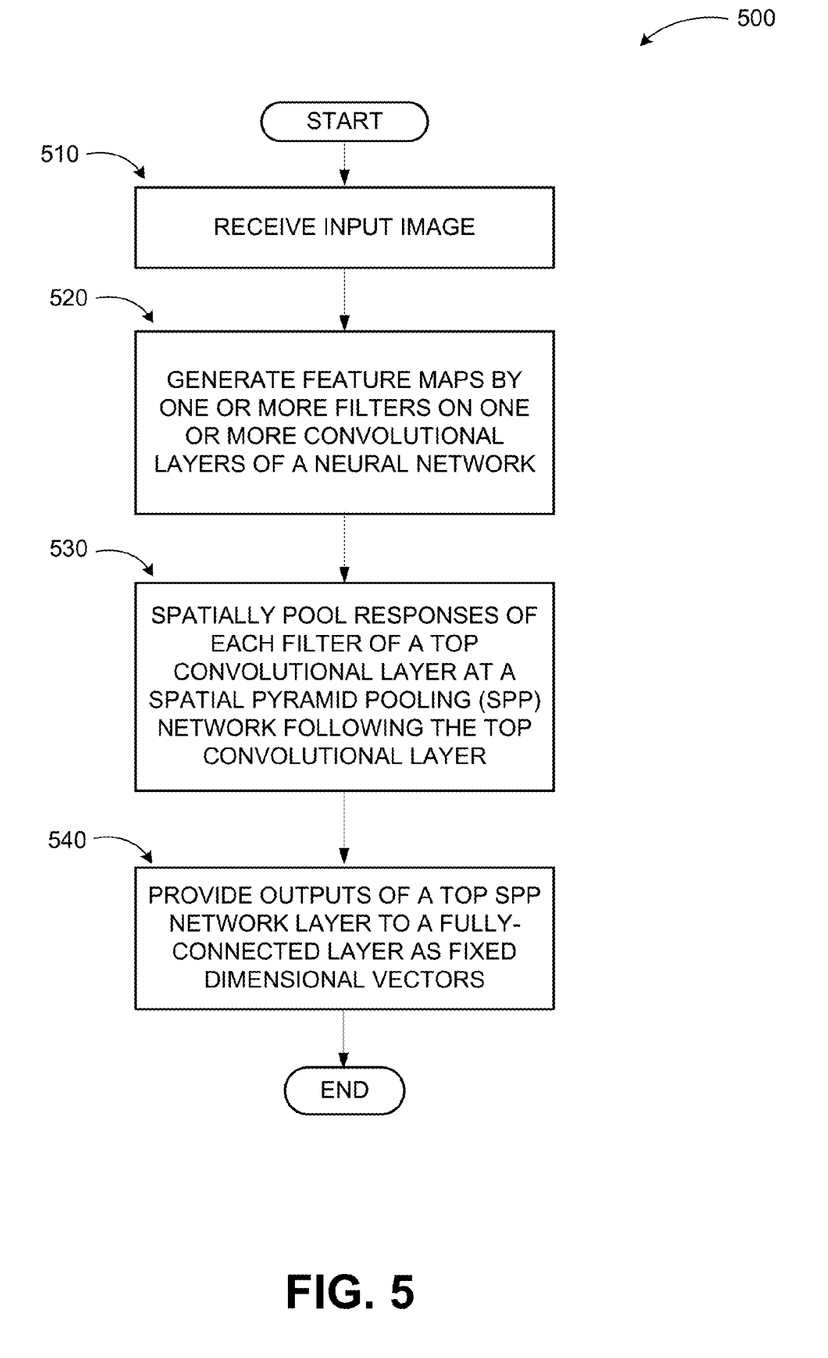
FIG. 5 illustrates a logic flow diagram of a process for image processing using SPP networks, according to embodiments.

FIG. 5 illustrates a logic flow diagram for process 500 of a process to process images using spatial pyramid pooling based neural networks, according to embodiments. Process 500 may be implemented on a server or other system.

Process 500 begins with operation 510, where an image processing application may receive an input image to process. The image processing application may be a vision application, an analysis application, a monitoring application, a search engine, or any comparable application that is configured to process the image using SPP network(s) as part of its operation.

At operation 520, feature maps may be generated by one or more filters on one or more convolutional layer of a neural network processing the input image. The filters may be sliding filters. A number of filters at the top layer of the convolutional layers may determine a number of bins needed in the following SPP network. The feature maps may be generated once from the entire input image at one or more scales.

At operation 530, the image processing application spatially pool responses of each filter at the one or more layers of the SPP network. The SPP network may pool the responses of each filter in a plurality of spatial bins and generate a multi-dimensional output vector, where a number of dimensions of the output vector is based on a number of the plurality of spatial bins multiplied by a number of filters in a last convolutional layer.

At operation 540, outputs of a top layer of the SPP network may be provided to a fully-connected layer as fixed dimensional vectors. An output of the fully connected layer may be used for training a classifier, scene reconstruction, event detection, video tracking, object recognition, image indexing, motion estimation, or comparable purposes.

The operations included in process 500 are for illustration purposes. Image processing using SPP layers may be implemented by similar processes with fewer or additional steps, as well as in different order of operations using the principles described herein.

In some embodiments, an image processing means for using SPP networks may include means for receiving an input image; means for generating feature maps by one or more filters on one or more convolutional layers of a neural network; means for spatially pooling responses of each filter of a top convolutional layer at a spatial pyramid pooling (SPP) network following the top convolutional layer, where the SPP network comprises one or more layers; and means for providing outputs of a top SPP network layer to a fully-connected layer as fixed dimensional vectors.

According to some examples, an image processing method using SPP networks may include receiving an input image; generating feature maps by one or more filters on one or more convolutional layers of a neural network; spatially pooling responses of each filter of a top convolutional layer at a spatial pyramid pooling (SPP) network following the top convolutional layer, where the SPP network comprises one or more layers; and providing outputs of a top SPP network layer to a fully-connected layer as fixed dimensional vectors.

According to other examples, the method may further include employing an output of the fully-connected layer for one or more of: training, a classifier, scene reconstruction, event detection, video tracking, object recognition, image indexing, and motion estimation. Spatially pooling responses of each filter of the top convolutional layer at the SPP network may include pooling responses of each filter in a plurality of spatial bins of the SPP network. Providing outputs of the top SPP network layer to the fully-connected layer may include providing the outputs of the top SPP network layer as kM-dimensional vectors, where M denotes a number of the spatial bins in the SPP network and k denotes a number of filters at the top convolutional layer.

According to further examples, the method may also include resizing the input image to fit a window size of the SPP network, training the neural network using back-propagation, and/or pre-computing a number of spatial bins of the SPP network based on a size of the input image. The method may further include for an image size of a×a and an SPP network layer that includes n×n bins, implementing the SPP network layer as a sliding window pooling layer, where a window size is defined by win=$\lceil a/n \rceil$ and a stride is defined by str=$\lfloor a/n \rfloor$ with $\lceil . \rceil$ and $\lfloor . \rfloor$ denoting ceiling and floor operations. The method may yet include concatenating outputs of the SPP network layers at the fully-connected layer. Spatially pooling responses of each filter of the top convolutional layer at the SPP network may also include employing maximum pooling on responses of the filters of the top convolutional layer.

According to yet other examples, a computing device to perform image processing is described. The computing device may include an input module configured to receive an input image through one or more of a wired or wireless communication, a memory configured to store instructions, and a processor coupled to the memory and the input module. The processor may execute an image processing application, which may be configured to receive an input image; generate feature maps by one or more filters on one or more convolutional layers of a neural network; spatially pool responses of each filter of a top convolutional layer in a plurality of spatial bins at a spatial pyramid pooling (SPP) network following the top convolutional layer, where the SPP network comprises one or more layers; and provide outputs of a top SPP network layer to a fully-connected layer as fixed dimensional vectors.

According to yet further examples, the feature maps may be generated once from the entire input image at one or more scales. The image processing application may be further configured to employ two or more fixed-size neural networks with respective SPP networks to process images of two or more sizes. The outputs of top SPP network layers of the two or more fixed-size neural networks may be configured to have a same fixed length. The image processing application may also be configured to train a first full epoch on a first one of the two or more fixed-size neural networks and train a second full epoch on a second one of the two or more fixed-size neural networks. The image processing application may be further configured to copy weights of the first one of the two or more fixed-size neural networks to the second one of the two or more fixed-size neural networks prior to training the second epoch on the second one of the two or more fixed-size neural networks, and perform the training on different neural network in an iterative manner.

According to other examples, a computer-readable memory device with instructions stored thereon to perform image processing is described. The instructions may include receiving an input image; generating feature maps by one or more filters on one or more convolutional layers of a neural network; spatially pooling responses of each filter of a top convolutional layer in a plurality of spatial bins of a spatial pyramid pooling (SPP) network following the top convolutional layer, where the SPP network comprises one or more layers; providing outputs of a top SPP network layer to a fully-connected layer as fixed dimensional vectors; and training a classifier to tag the input image based on the fixed dimensional vectors received at the fully-connected layer.

According to further examples, The instructions may also include resizing the input image such that min (w; h)=s, where w is a width of the image, h is a height of the image, and s represents a predefined scale for the image, and training different full epochs on different fixed-size neural networks by copying weights of a first fixed-size neural network to subsequent fixed-size neural networks in an iterative manner.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to perform image processing, the method comprising:
   receiving an input image;
   generating feature maps by one or more filters on one or more convolutional layers of a neural network;
   spatially pooling responses of each filter of a top convolutional layer at a spatial pyramid pooling (SPP) network following the top convolutional layer, wherein the SPP network comprises one or more layers; and
   providing outputs of a top SPP network layer to a fully-connected layer as fixed dimensional vectors.

2. The method of claim 1, further comprising:
   employing an output of the fully-connected layer for one or more of: training a classifier, scene reconstruction, event detection, video tracking, object recognition, image indexing, and motion estimation.

3. The method of claim 1, wherein spatially pooling responses of each filter of the top convolutional layer at the SPP network comprises:
pooling responses of each filter in a plurality of spatial bins of the SPP network.

4. The method of claim 3, wherein providing outputs of the top SPP network layer to the fully-connected layer comprises:
providing the outputs of the top SPP network layer as kM-dimensional vectors, where M denotes a number of the spatial bins in the SPP network and k denotes a number of filters at the top convolutional layer.

5. The method of claim 1, further comprising:
resizing the input image to fit a window size of the SPP network.

6. The method of claim 1, further comprising:
training the neural network using back-propagation.

7. The method of claim 1, further comprising:
pre-computing a number of spatial bins of the SPP network based on a size of the input image.

8. The method of claim 7, further comprising:
for an image size of a×a and an SPP network layer that includes n×n bins, implementing the SPP network layer as a sliding window pooling layer, where a window size is defined by win=⌈a/n⌉ and a stride is defined by str=⌊a/n⌋ with ⌈.⌉ and ⌊.⌋ denoting ceiling and floor operations.

9. The method of claim 1, further comprising:
concatenating outputs of the SPP network layers at the fully-connected layer.

10. The method of claim 1, wherein spatially pooling responses of each filter of the top convolutional layer at the SPP network comprises:
employing maximum pooling on responses of the filters of the top convolutional layer.

11. A computing device to perform image processing, the computing device comprising:
an input module configured to receive an input image through one or more of a wired or wireless communication;
a memory configured to store instructions; and
a processor coupled to the memory and the input module, the processor executing an image processing application, wherein the image processing application is configured to:
receive an input image;
generate feature maps by one or more filters on one or more convolutional layers of a neural network;
spatially pool responses of each filter of a top convolutional layer in a plurality of spatial bins at a spatial pyramid pooling (SPP) network following the top convolutional layer, wherein the SPP network comprises one or more layers; and
provide outputs of a top SPP network layer to a fully-connected layer as fixed dimensional vectors.

12. The computing device of claim 11, wherein the feature maps are generated once from the entire input image at one or more scales.

13. The computing device of claim 11, wherein the image processing application is further configured to:
employ two or more fixed-size neural networks with respective SPP networks to process images of two or more sizes.

14. The computing device of claim 13, wherein the outputs of top SPP network layers of the two or more fixed-size neural networks are configured to have a same fixed length.

15. The computing device of claim 13, wherein the image processing application is further configured to:
train a first full epoch on a first one of the two or more fixed-size neural networks; and
train a second full epoch on a second one of the two or more fixed-size neural networks.

16. The computing device of claim 15, wherein the image processing application is further configured to:
copy weights of the first one of the two or more fixed-size neural networks to the second one of the two or more fixed-size neural networks prior to training the second epoch on the second one of the two or more fixed-size neural networks.

17. The computing device of claim 15, wherein the image processing application is further configured to:
perform the training on different neural network in an iterative manner.

18. A computer-readable memory device with instructions stored thereon to perform image processing, the instructions comprising:
receiving an input image;
generating feature maps by one or more filters on one or more convolutional layers of a neural network;
spatially pooling responses of each filter of a top convolutional layer in a plurality of spatial bins of a spatial pyramid pooling (SPP) network following the top convolutional layer, wherein the SPP network comprises one or more layers;
providing outputs of a top SPP network layer to a fully-connected layer as fixed dimensional vectors; and
training a classifier to tag the input image based on the fixed dimensional vectors received at the fully-connected layer.

19. The computer-readable memory device of claim 18, wherein the instructions further comprise:
resizing the input image such that min (w; h)=s, where w is a width of the image, h is a height of the image, and s represents a predefined scale for the image.

20. The computer-readable memory device of claim 18, wherein the instructions further comprise:
training different full epochs on different fixed-size neural networks by copying weights of a first fixed-size neural network to subsequent fixed-size neural networks in an iterative manner.

* * * * *